Figure 1:
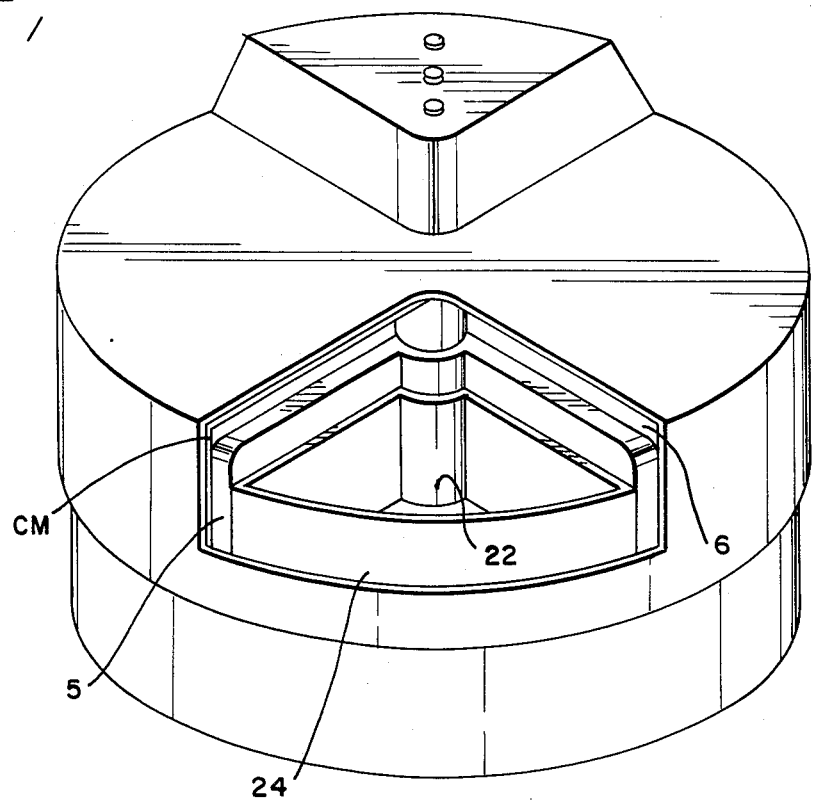

United States Patent [19]

Zammarano

[11] Patent Number: 4,617,874
[45] Date of Patent: Oct. 21, 1986

[54] DEVICE FOR THE CONSERVATION AND THE TIME-DISTRIBUTION OF FOOD FOR ANIMALS

[76] Inventor: Alessandro Zammarano, Via delle Fornaci, 29, 00165 Roma, Italy

[21] Appl. No.: 706,217

[22] Filed: Feb. 27, 1985

[30] Foreign Application Priority Data

Feb. 28, 1984 [IT] Italy ................... 47770 A/84

[51] Int. Cl.⁴ .............................. A01K 5/02
[52] U.S. Cl. .................................. 119/51.12
[58] Field of Search ................ 119/51.11, 51.12

[56] References Cited

U.S. PATENT DOCUMENTS

| | | | |
|---|---|---|---|
| 2,528,742 | 11/1950 | Coffing | 119/51.12 |
| 4,248,175 | 2/1981 | Navarro | 119/51.12 |
| 4,450,790 | 5/1984 | Stansburg, Jr. | 119/51.12 |

FOREIGN PATENT DOCUMENTS

| | | | |
|---|---|---|---|
| 1546638 | 5/1979 | United Kingdom | 119/51.12 |
| 2037140 | 7/1980 | United Kingdom | 119/51.11 |

*Primary Examiner*—Hugh R. Chamblee
*Attorney, Agent, or Firm*—Beveridge, DeGrandi and Weilacher

[57] ABSTRACT

A device for the conservation and the time-distribution of food for animals comprising a gas compressor 1, a cooling condenser 2 for said gases, a cooling and/or freezing evaporator 3, a thermostat 4 for the continuous temperature regulation and provided with a cup container 7, wherein said cups will get, by means of a rotation of a motor 29, said rotation being operated by programmed timer 18, into a position 22 corresponding to an opening of an upper cover of cold ambient 26, for the feeding of home animals.

7 Claims, 8 Drawing Figures

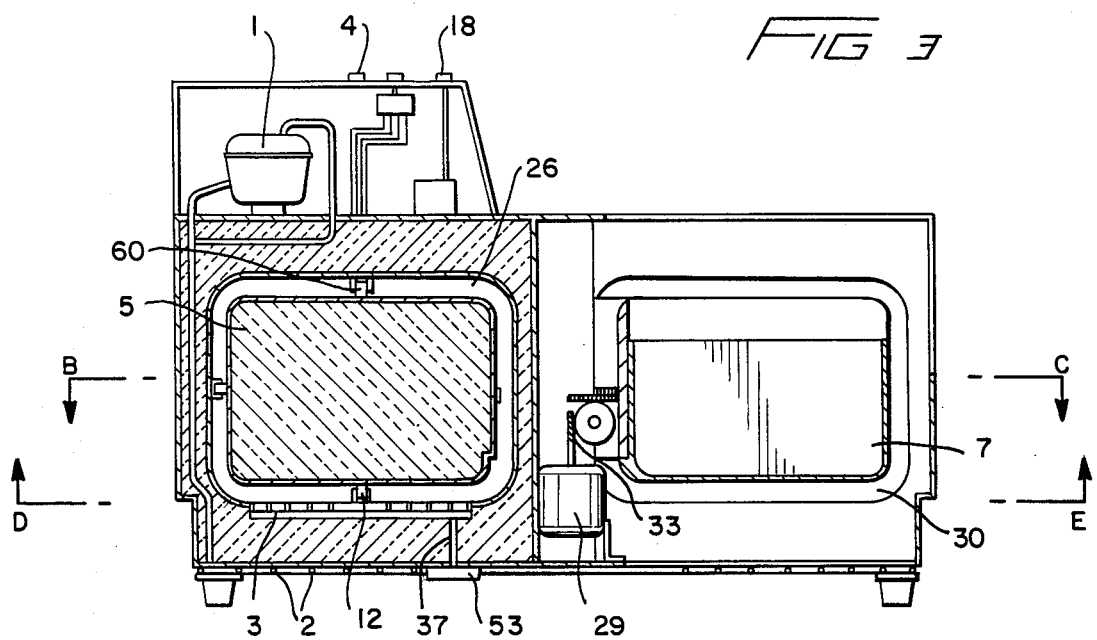
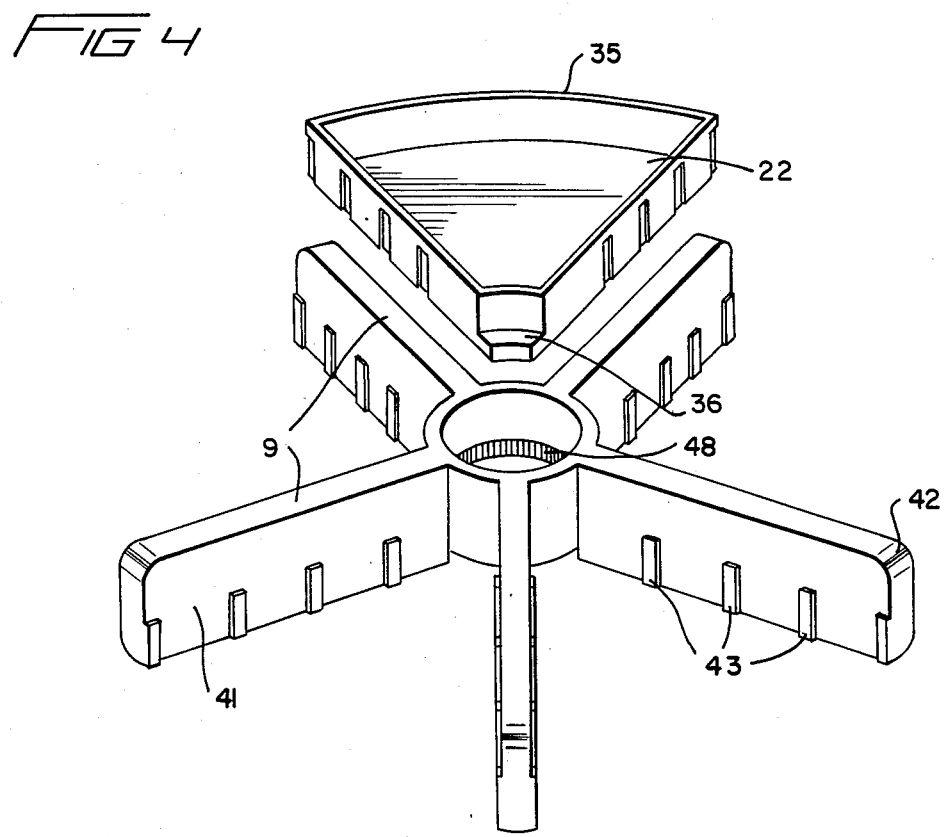

SEC. B-C

SEC. D-E

DEVICE FOR THE CONSERVATION AND THE TIME-DISTRIBUTION OF FOOD FOR ANIMALS

The present invention concerns a device for the conservation, in a cold and/or frozen ambient, of food for animals, wherein said device will automatically distribute in following stages and/or in following days, precooked or fresh food.

The need of feeding small home animals during one's absence from home on week-ends or on other occasions, in which particularly cats and dogs must be left alone even for more days, is well known.

The art has, up to now, not provided any automatic device for the solution of said problem.

It is in the aim of the present invention to realize an easy and cheap device for the conservation and automatic time-distribution of fresh food.

The aim is reached by means of the device according to the present invention comprising a gas compressor, a cooling coil for said gases, a cooling and/or freezing plate, a thermostat for the continuos temperature regulation, characterized in a cylindrical container the walls thereof being coated with an insulating material, with an upper cover being provided with a circular sector opening corresponding to an opening of a shape similar to the one of the bottom, and to a gap of a perimetral edge inside which a structure is provided with a plurality of bins carrying a plurality of cups and supported on wheels so as to be put into rotation, by means of an electric motor, until a timer doesn't stop said rotation when the cup with the programmed food has got into correspondence with said opening and thus at the animal's disposal.

Figure 2:
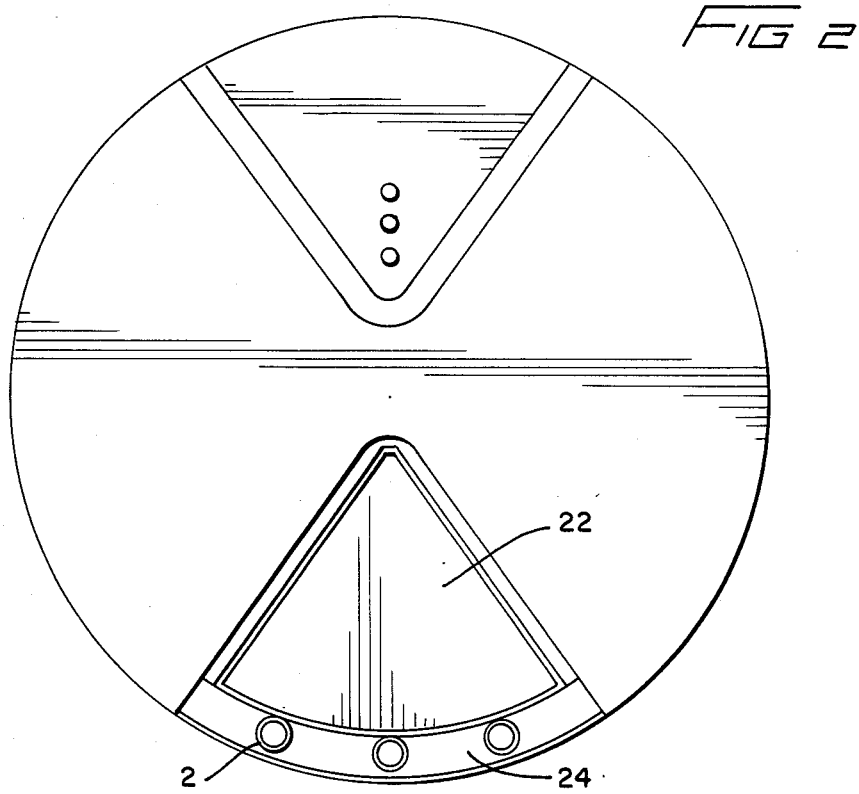
Figure 5:
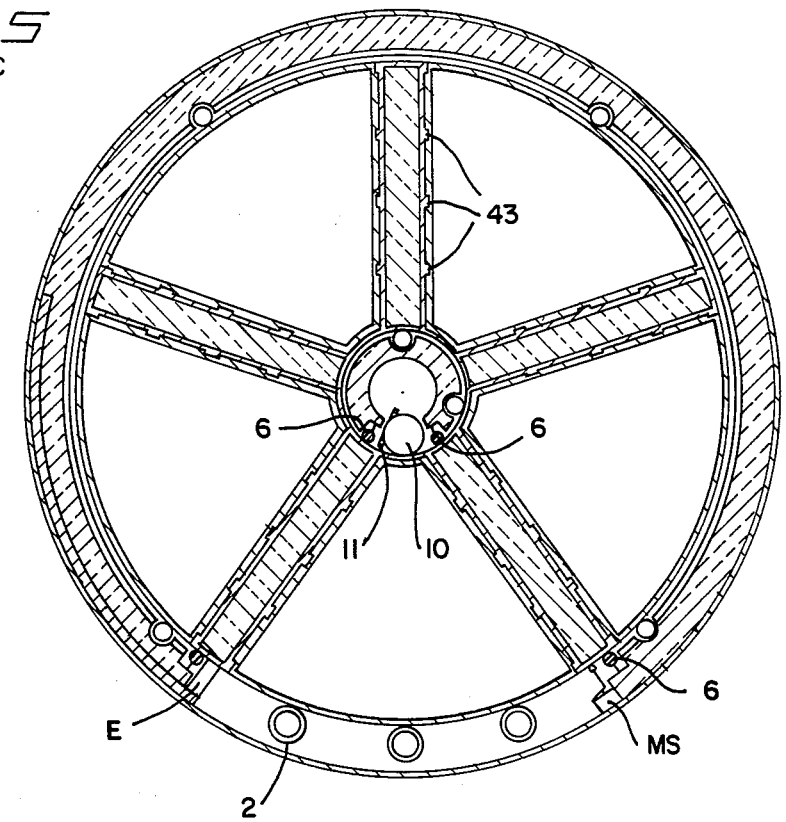
Figure 6:
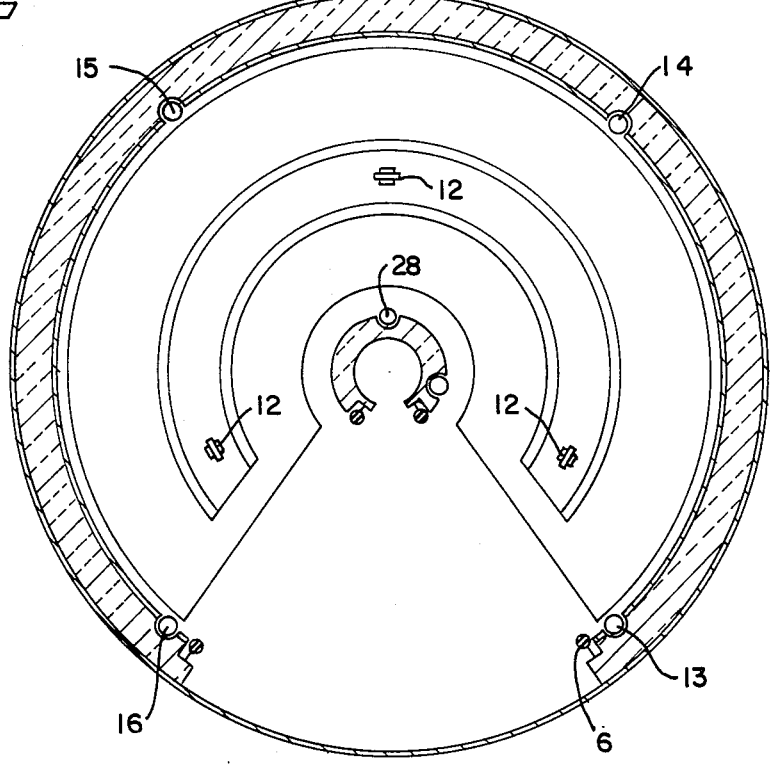
Figure 7:
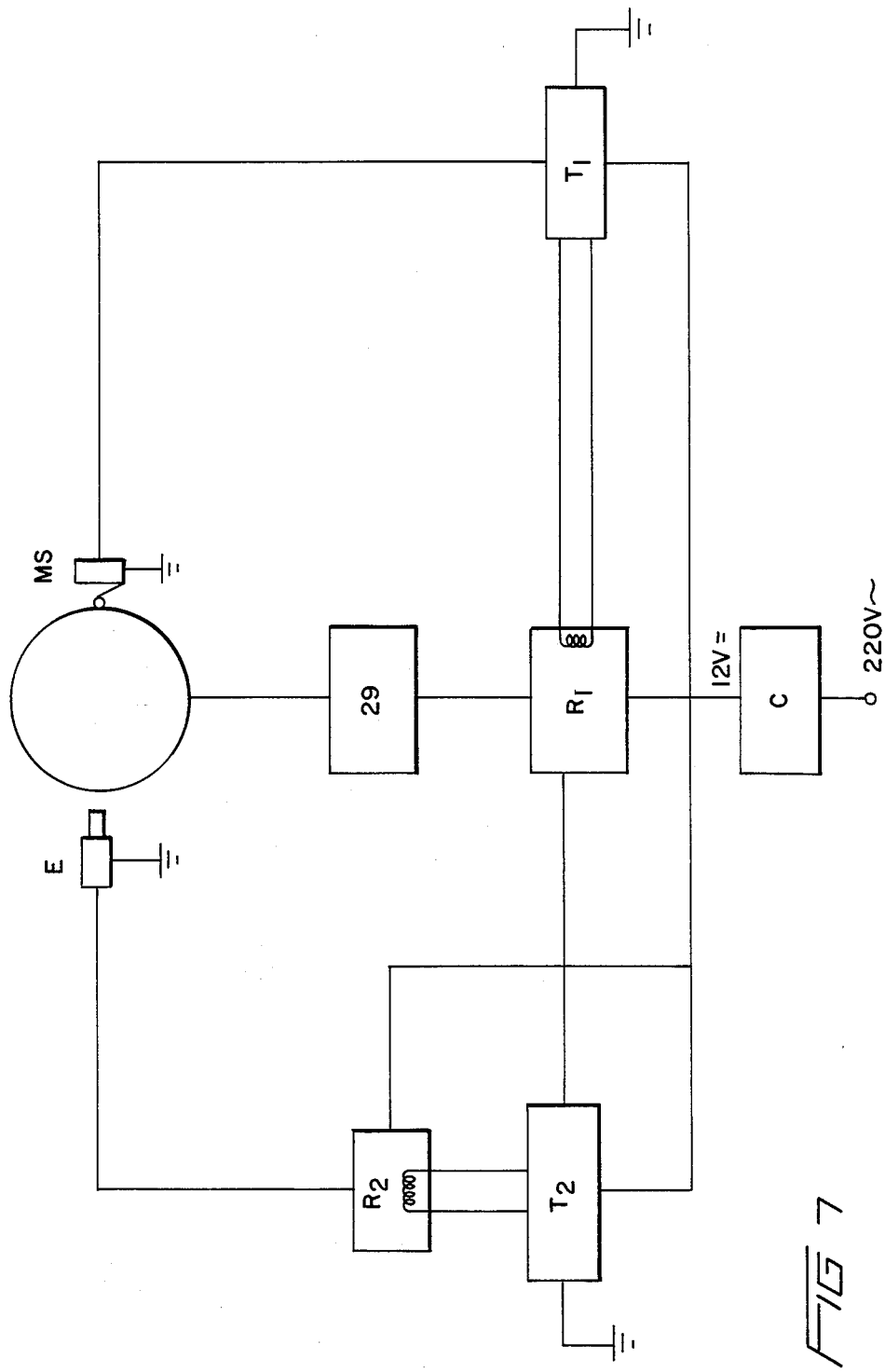

The present invention will be shown hereinbelow in a preferred embodiment in FIGS. 1 to 8 of the attached drawings, which show:

FIG. 1, an axonometric view of the whole device;

FIG. 2, a top view;

FIG. 3, a vertical section;

FIG. 4, a perspective view of the structure with a plurality of bins (cups);

FIGS. 5 and 6, sections B-C and D-E of FIG. 3;

FIG. 7, the scheme of the electric plant; and

Figure 8:
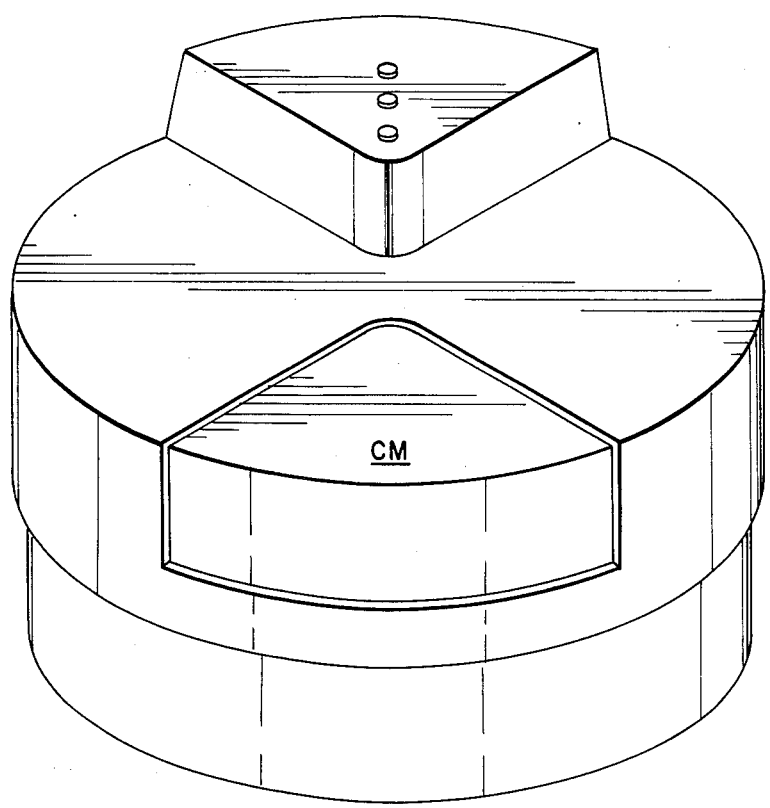

FIG. 8, a view similar to FIG. 1 wherein the feed opening of the container is obstructed by the mobile cover to prevent the animal from eating unthawed food.

The present invention concerns a device for the conservation and the time-distribution of food for animals, comprising compressor 1 placed above or in any other disposition with respect to ambient 26 being cooled and/or frozen, a cooling condenser 2 for the gases placed below said ambient 26 or in any other disposition, a cooling or freezing evaporator 3, a thermostat 4 for the continuous temperature regulation.

The walls of ambient 26 are coated with insulating material 5.

Ambient 26 shows an opening in the upper cover corresponding to the opening in the bottom and through which the condenser 2 and the gap 24 of insulating edge 5 is visible so as to form two openings placed in the inner lateral parts being provided with comprissible gaskets 6.

The opening has a dimension equal to the one of a bin (cup) of container 7, and the openings are slightly wider than the length of the radius of the same container, and slightly higher.

Said container 7 shows rounded edges 42, it is open on upper part 35 and consists in a plurality of extractable bins with rounded edges separated by rounded walls 9 consisting in layers 41 of preferbaly plastic material internally insulated, kept in one single body with the rest of container 7, by means of fixed joints 43, while the bottom and the sides consist in a single layer.

Said container 7, once it is placed into ambient 26 resting, with the bottom, on a plurality of wheels 12 and laterally on wheels 13,14,15,16,28, will be put into movement when programmed timer 18 operates electric motor 29 by means of the axis with helical end 33 making turn mating gears 10 and 11 which put into movement internal circular toothing 48 thus causing the rotation that will be stopped by said timer 18 by means of a micro-switch MS when the ball axis releases the impulse entering in the provided housing, so that the cups with the predetermined food will get into position 22, outside ambient 26.

The thermal sealing of said ambient 26 is provided due to gaskets 6 and to the relative support 30 which, once they have contacted of walls 41 of container 7 in the area of the insulated walls 9 separating the bins, form an insulated wall keeping the low temperature in ambient 26, which is insulated and closed, and leaving outside one bin (cup) 22 of the container which, the upper part thereof being open, places the food container therein at the animal's disposal.

So as to prevent the animal from immediately eating too cold food, the present invention provides (in the area over the food which must be fed) a mobile programmable cover CM which can be opened automatically as to place the food at the animal's disposal at a temperature proper to be eaten by means of the following process:

when container 7 moves to distribute a new meal electromagnet E incorporated into cover CM couples to one of the proper slits of container 7, conveying said cover over the new meal;

warm air circulation in summer, or air heated by the condenser when it is activated contacts the meal (open area of cup-bin 22), and the bottom and all walls of said cup-bin 22 (exactly passing in the interspaces between cup and insulated walls 9) warm the meal to a proper temperature mobile cover CM is shown in the closed position in FIG. 8.

The programmed timer calculating the acclimatization times according to place and temperature deenergizes, electromagnet E by returning the plunger and calling back said electromagnet E, with mobile cover CM incorporated and hinged into the middle of the device, to the starting position by means of the tension of a prestressed elastic or spring.

In a constructive variant concerning the displacement of the coil condenser 2, the same, even if remaining below the device's structure, will be placed and will have a structure such as to have the maximum possible ventilation, as well as in such a position as to achieve maximum heating, by conducting warm air, over the bin that has come out of the cooled or frozen area containing the food, e.g. distancing the same from the edge of the device and inclining the same so that the higher part thereof may get under the bin with the food for the animal, thus conducting warm air towards the top and into said area.

In a further variant, the coil condenser 2 even if partially remaining below said device (in the area below the bin that has come out from the cooled or frozen area) will be in part vertically placed nearby the rounded side of the device with an appropriate protection, so as to favour the ventilation thereof.

Furthermore, so as to cause the evaporator with cooling plate 3 to better cool food, even remaining below the container with a plurality of bins, it will be preferable to extend the same also sideways and/or above said container.

Should the warmth from the condenser for warming up the animal's food not be enough (the device being placed outside with particularly cold weather), and should it be required, a further warming system will be provided, like, e.g., an electric resistance heater or the like.

Coil 2 is provided with a container 53 for recollecting the water coming from ambient 26.

A further feature of the present invention consists in that container 7 with rounded edges 42 has the openings 35 thereof in the upper part and consists in a plurality of bins forming one single body by means of joints 36 as well as fixed joints (male points on fixed joints 43 to be inserted into the female holes of the mobile bins); that bins (cups) 22 forming container 7 are extractable being just placed with pressure and joints by means of fixed joints 43 with male points placed at the sides of central body of container 7 and the holes provided on the corresponding sides of bins 22; and that joint 36 will be placed below the round part of the central body.

The cooled ambient 26 has a small discharge tube 37 for the water coming from the cooling and/or freezing plate 3 and that will get into recollecting container 53 placed below said ambient 26, said container being incorporated in the cooling grate of coil 2.

The present invention further shows a wheel 60 placed inside ambient 26, on the side opposite to the open one where the animal takes the food, above and in contact with insulated wall 9 that will be placed below the container 7 when the same stops in the feedbox position; said wheel will serve so that when a bin of the container will be inserted in the open area the pressure exerted the central body of said container 7 will be counterweighed by the wheel's 60 resistance which in turn, by means of the supports, rests and is supported on the top of ambient 26 so that nothing moves when the pressure is so exerted.

Finally, the wheel 12 is placed inside ambient 26, on the side opposite to the open one where the animal takes the food, below and in contact with insulated wall 9 that will be placed above container 7 when the same stops in the feedbox position; said wheel will serve so that when one bin of container 7 is extracted, the pressure exerted on the central body of the same will be counterweighed by the resistance of wheel 12 which in turn by means of supports rests and is supported, being fixed to the bottom of ambient 26 so that nothing moves in the presence of such pressure.

For what concerns the funcioning of the electric plant of FIG. 7, the buffer circuit C loads the accumulators as well as the commutation circuit, for the 12V feeding of timers $T_1$ and $T_2$ and of relays $R_1$ and $R_2$.

Timer $T_1$ has a twentyfour hours plus one minute cycle; Timer $T_1$ activates relay $R_1$ at the end of the cycle. $R_1$ being excited provides a starter impulse to timer $T_2$ that will excite relay $R_2$ for a time period variable between one to three hours or more by means of a control on timer $T_1$ or $T_2$.

Relay $R_2$ activates electromagnet E, and said electromagnet hooks, passing by, container 7 in the apposite slot thus providing the covering for the time previously determined by timer $T_2$.

At the same time, relay $R_1$ switches on small motor 29 to rotate container 7.

Once the partial rotation has been performed, microswitch MS being operated by a depression on the container 7 will provide a stop impulse to timer $T_1$ or $T_2$ that deactivates relay $R_2$ to switch off small motor 29.

I claim:

1. A device for preserving animal food and distributing the food to an animal according to a preselected schedule, said device comprising:

a housing having an enclosed area for preserving the food therein, said housing having a feeding opening which provides an exposed area that occupies only a portion of the area within said housing and that provides access to the food;

a support member rotatably mounted in said housing, said support member carrying a plurality of open bins for containing the food and including a plurality of partitions formed of thermal insulative material;

sealing means operable between said housing and said support member, said sealing means and said thermally insulative partitions being operable to isolate the bins from each other and to isolate said enclosed area from said exposed area;

refrigerating means for regulating the temperature of said enclosed area, said refrigerating means including a compressor, and a thermostat for controlling said refrigerating means;

means for rotating said support member within said housing, said rotating means rotating said support member to move said bins into communication with the feeding opening;

means for heating a said bin located in said exposed area; and control means for controlling said rotating means, said control means including a timer for actuating said rotating means to rotate each of said bins having food into communication with said feeding opening in accordance with said preselected schedule.

2. A device as claimed in claim 1 further comprising a movable cover which is movable to a position where it closes the feeding opening when the temperature of the food in the bin at the feeding opening is less than a predetermined eating temperature, said cover being movable away from said feeding opening when the temperature of the food is at said predetermined eating temperature.

3. A device as claimed in claim 1 including a cover means which is movable relative to said housing, said cover means being operable to prevent access to food in a bin which is below eating temperature after it has moved from the enclosed area to the exposed area in the housing, said cover means being movable to a position where it exposes the food for consumption after the food reaches said eating temperature.

4. A device as claimed in claim 3 having means for engaging the cover means with the support member so that rotation of the support member moves the cover member to a position over said exposed area.

5. A device as claimed in claim 4 having means for heating food in the exposed area.

6. A device as claimed in claim 5 wherein the heating means includes an electric resistance heater.

7. A device as claimed in claim 5 wherein the heating means includes a refrigeration condenser which is included in said refrigerating means.

* * * * *